United States Patent
Shimizu et al.

(10) Patent No.: US 7,239,602 B2
(45) Date of Patent: *Jul. 3, 2007

(54) OPTICAL INFORMATION RECORDING MEDIUM WITH A PARTITION WALL BETWEEN AN INFORMATION TRACKS GROOVE AND A PREFORMAT PIT ENCODING INFORMATION THEREFOR

(75) Inventors: Akihiko Shimizu, Yokohama (JP); Kenya Yokoi, Kawasaki (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 206 days.

(21) Appl. No.: 09/406,570

(22) Filed: Sep. 24, 1999

(65) Prior Publication Data

US 2002/0071380 A1    Jun. 13, 2002

Related U.S. Application Data

(63) Continuation-in-part of application No. 09/140,975, filed on Aug. 27, 1998, now abandoned.

(30) Foreign Application Priority Data

Sep. 24, 1998 (JP) ................. 10-269723
Oct. 12, 1998 (JP) ................. 10-289547

(51) Int. Cl.
*G11B 7/24* (2006.01)
(52) U.S. Cl. .................................. 369/275.4
(58) Field of Classification Search ............. 369/275.4, 369/275.3
See application file for complete search history.

(56) References Cited

U.S. PATENT DOCUMENTS 4,423,502 A * 12/1983 Dil ........................ 369/275.4
4,587,648 A * 5/1986 Ando ..................... 369/275.4

(Continued)

FOREIGN PATENT DOCUMENTS

JP    9-326138    * 12/1997
JP    11-66630    * 9/1999

OTHER PUBLICATIONS

Abstract of JP 09/230696 published May 9, 1997.*
MAT (Machine assisted translation) of JP 11-066630.*

*Primary Examiner*—A Psitos
(74) *Attorney, Agent, or Firm*—Cooper & Dunham LLP

(57) ABSTRACT

An optical information recording medium and a method of mastering an optical information recording medium. Crosstalk is avoided even when phase pits flanking a groove are radially aligned so that preformat information can be reliably reproduced after information is recorded at the grooves. A phase pit that encodes preformat information for a groove is radially spaced from that groove by a partition wall but is connected to an adjacent groove. When mastering, respective first and second exposing light beams are used to form the grooves and the phase pits, and the spacing between the two beams and, therefore, the width of the partition walls in the radial direction is precisely and easily controlled by controlling the inclination angle of at least one of the beams relative to an objective lens in the mastering exposure system.

12 Claims, 17 Drawing Sheets

U.S. PATENT DOCUMENTS

| | | | |
|---|---|---|---|
| 5,448,552 A * | 9/1995 | Onagi | 369/275.4 |
| 5,459,712 A * | 10/1995 | Sugaya et al. | 369/275.4 |
| 5,477,527 A * | 12/1995 | Tsuchiya et al. | 369/275.4 OR |
| 5,504,734 A * | 4/1996 | Morita | 369/275.3 X |
| 5,602,824 A * | 2/1997 | Ooki et al. | 369/275.4 |
| 5,638,354 A * | 6/1997 | Nakayama et al. | 369/275.3 |
| 5,666,345 A * | 9/1997 | Takahashi et al. | 369/275.1 |
| 5,673,250 A * | 9/1997 | Mieda et al. | 369/275.4 OR |
| 5,883,879 A * | 3/1999 | Fukuoka et al. | 369/275.3 X |
| 5,892,752 A * | 4/1999 | Matsuura | 369/275.4 |
| 5,926,446 A * | 7/1999 | Shimizu | 369/275.4 |
| 5,933,410 A * | 8/1999 | Nakane et al. | 369/275.3 |
| 5,933,411 A * | 8/1999 | Inui et al. | 369/275.3 |
| 6,055,223 A * | 4/2000 | Ohta et al. | 369/275.4 |
| 6,118,752 A * | 9/2000 | Miyagawa et al. | 369/275.3 |
| 6,128,270 A * | 10/2000 | Nishikawa | 369/275.4 |
| 6,404,729 B1 * | 6/2002 | Yamaoka et al. | 369/275.4 |
| 2002/0075793 A1 * | 6/2002 | Tsukamoto | |

* cited by examiner

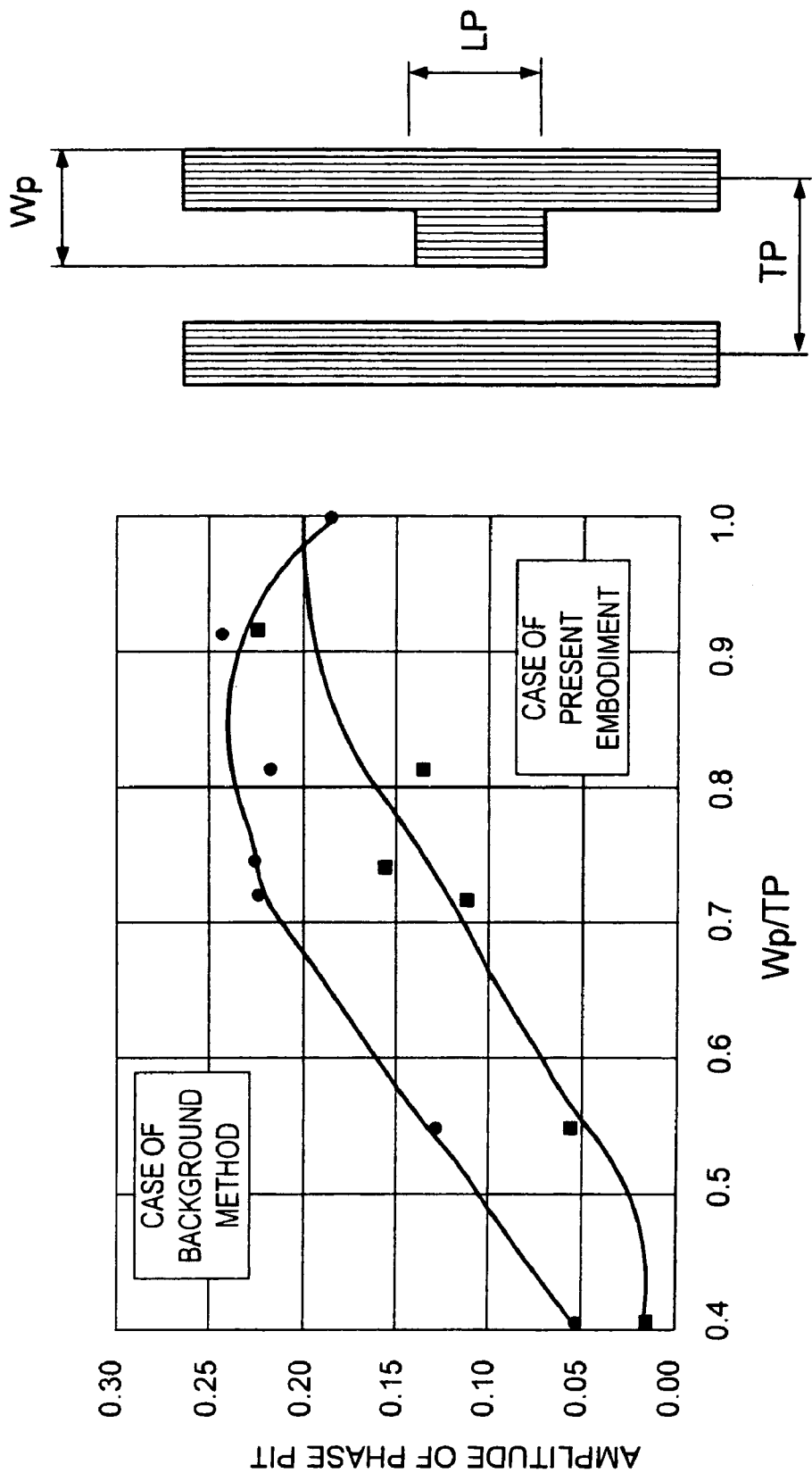
F I G. 4

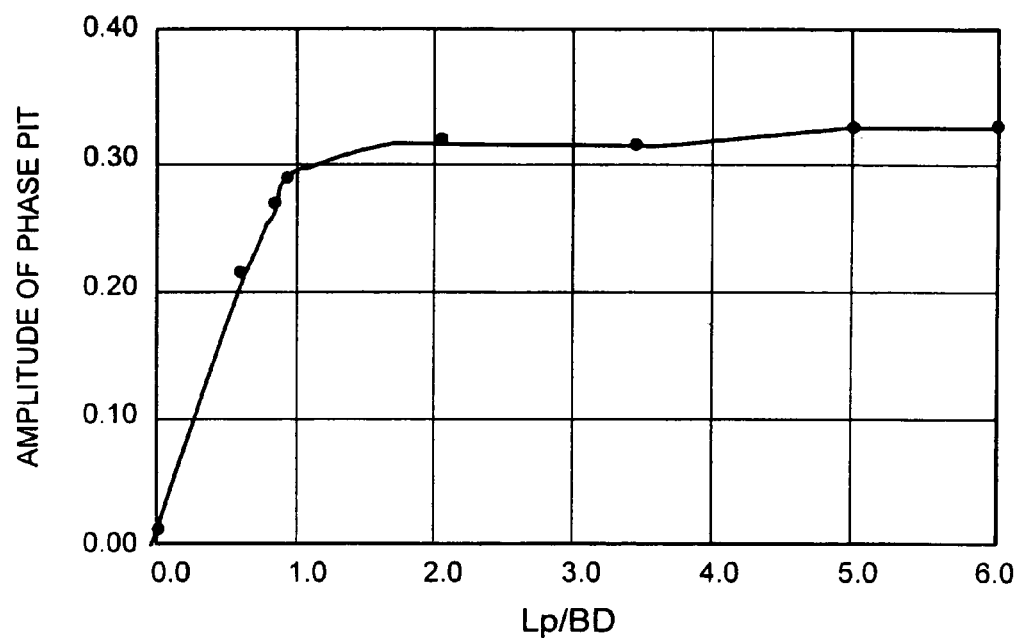
F I G. 5

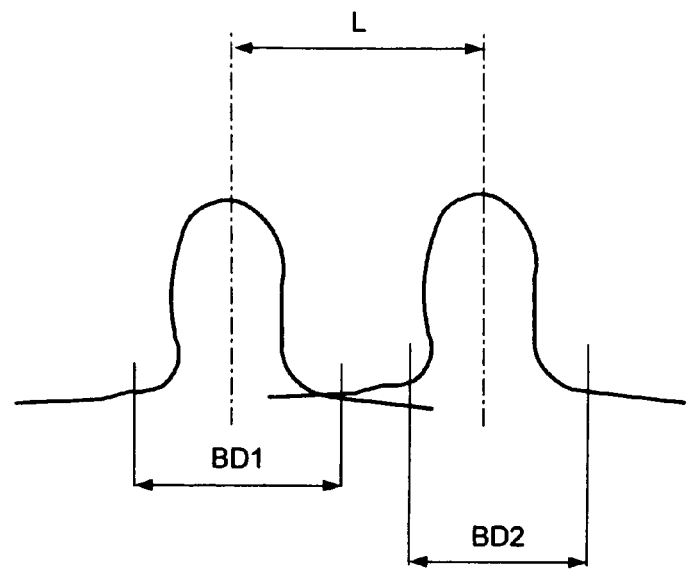
F I G. 7
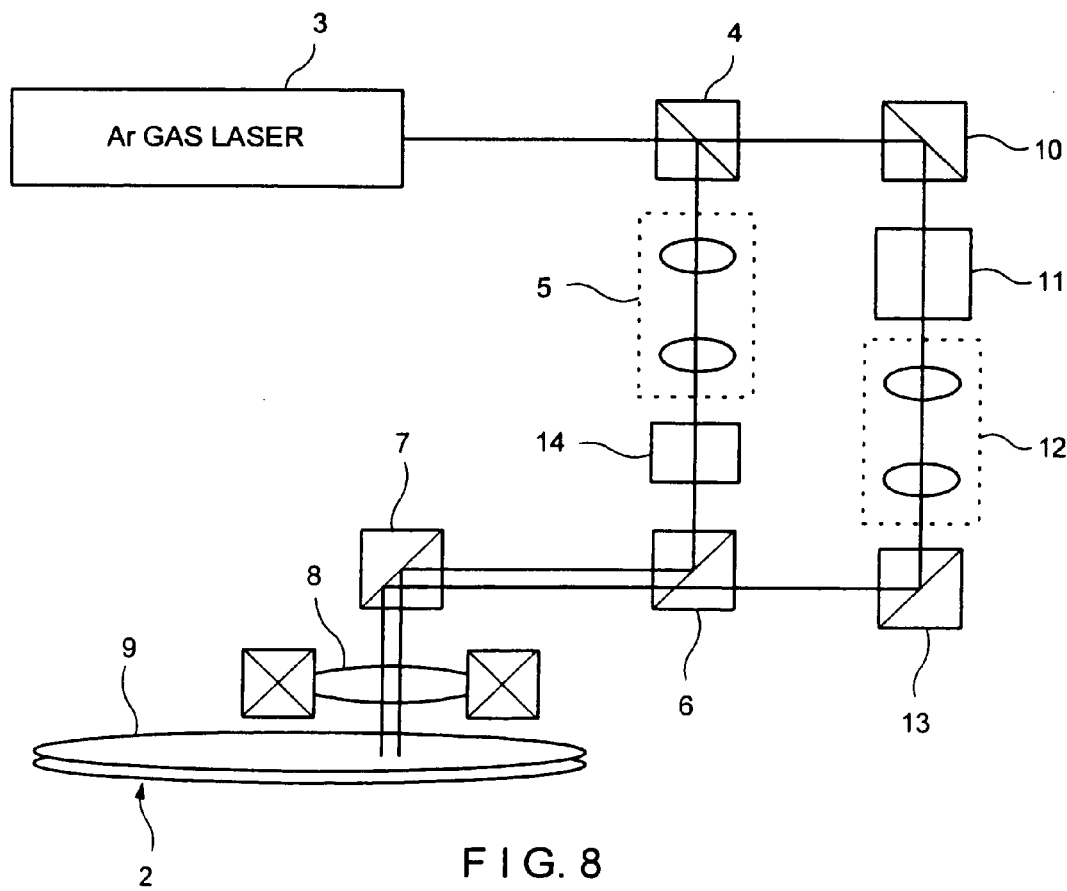
F I G. 8

MAKING OF RESIST
ORIGINAL BOARD

EXPOSING OF
ORIGINAL BOARD

DEVELOPING

PROCESSING OF
CONDUCTIVE FILM

Ni ELECTROFORMING

PEELING-OFF
CLEANING
POLISHING OF REAR SURFACE
FINAL PROCESSING

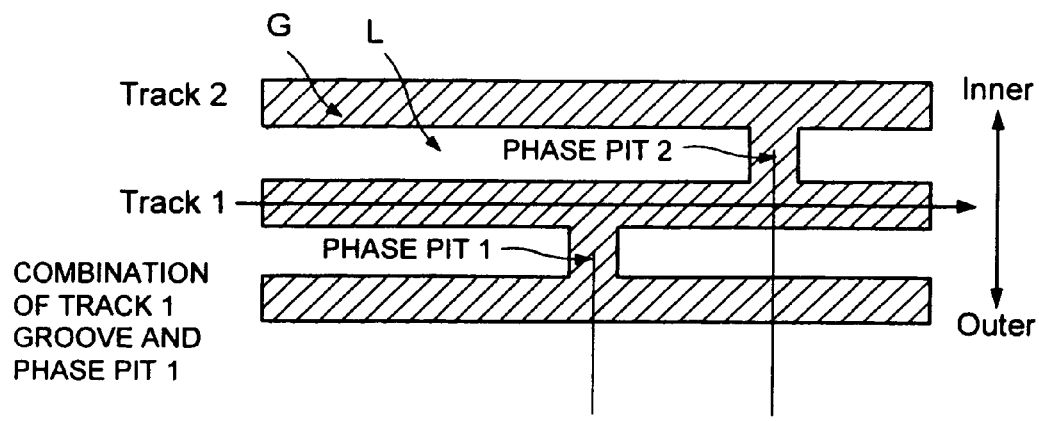
F I G. 14A
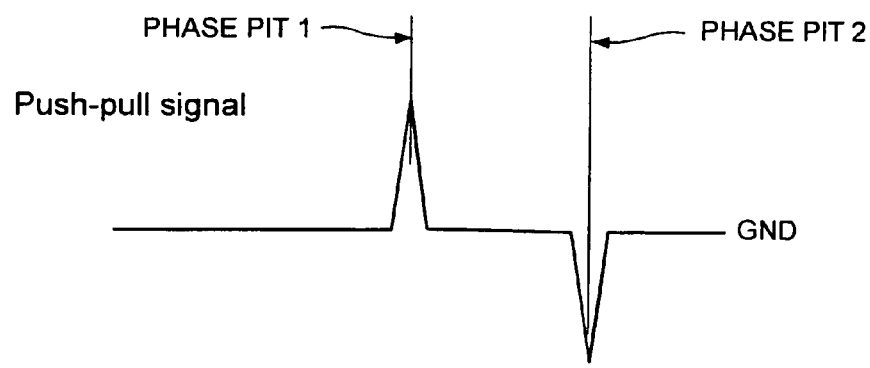
F I G. 14B

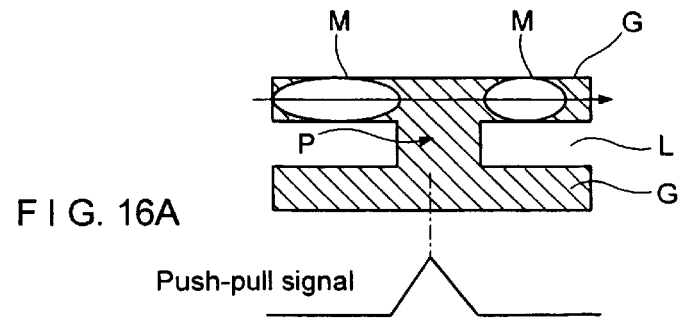
F I G. 16A
Push-pull signal
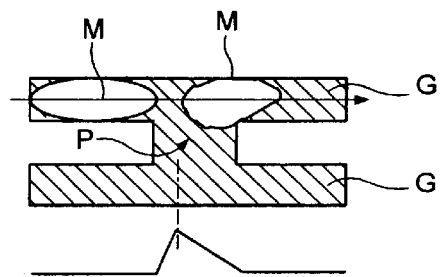
F I G. 16B
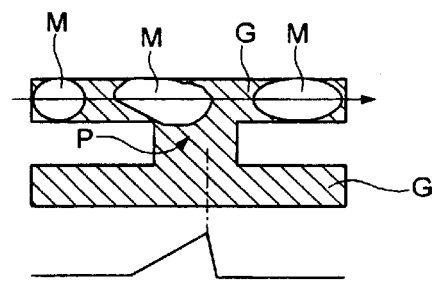
F I G. 16C
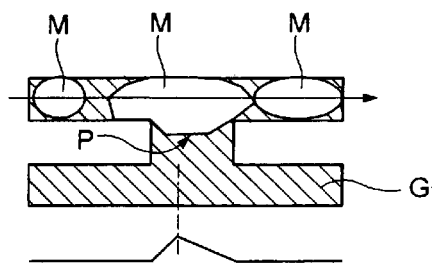
F I G. 16D

OPTICAL INFORMATION RECORDING MEDIUM WITH A PARTITION WALL BETWEEN AN INFORMATION TRACKS GROOVE AND A PREFORMAT PIT ENCODING INFORMATION THEREFOR

CROSS-REFERENCE

This application is a continuation-in-part of application Ser. No. 09/140,975 filed on Aug. 27, 1998 and now abandoned, which is hereby incorporated by reference herein.

FIELD

This patent specification relates to an optical information recording medium, for example a phase-change type optical disk.

BACKGROUND ART

Generally, in an optical information recording medium capable of writing in optical information, a synchronization signal for searching position and address information (hereinafter, such information is called "pre-format information") is included in a disc substrate in the form of a phase groove. Such pre-format information can be in the form of a zigzag line (wobbling the groove), or can be represented by changing the length, distance, and position of a discontinuous groove (hereinafter, such groove is called "phase pit").

For the purpose of increasing the recording capacity of an optical disc, it is desirable to reduce the distance between the grooves employed as the information recording track (hereinafter, such distance is called "track pitch"). However, the need for sufficient C/N restricts the recording capacity of the optical information recording medium in the case of utilizing the wobbling method.

The published specification of Japanese Laid-open Patent Publication No. 9-17029/1997 proposes a method of forming the phase pit on the lands between the information grooves. FIGS. 11A–11C illustrate such an optical information recording medium, where a phase pit P is formed on the land L between the grooves G. A phase P resembles the run of a ladder, namely, connecting the grooves G of two adjacent information tracks.

Such phase pits P, can be read with photodiodes split into two in the radius direction of the optical disc (the direction perpendicular to the track direction) in a light-receiving system, and by detecting the signal obtained through optoelectric conversion by the photodiodes. For more detail, refer to FIG. 8 and the explanation corresponding to FIG. 8 in the published specification of Japanese Laid-open Patent Publication No. 9-17029/1997.

In the case of phase pits P present on both lands L at the right and left sides of a groove G, the pre-format information is simultaneously read out and can cause "cross-talk". In order to reduce cross-talk, two types of pre-format information phase pits P are formed—for the even number EVEN and for the odd number ODD, and those patterns are changed from one to the other in case of cross-talk situations. For more detail, refer to FIG. 2 and the explanation corresponding to FIG. 2 in the published specification of Japanese Laid-open Patent Publication No. 9-17029/1997. By adopting the above-mentioned method, cross-talk can be reduced.

However, it is technically difficult to determine ahead of time where cross-talk would occur, that is, the position where phase pits P simultaneously exist on the lands L at the right and left sides of a groove G when exposing a master, so as to change from one to the other of the EVEN pattern for the even number and the ODD pattern for the odd number. If there is no error in keeping track of the revolutions of the master being exposed, the position for the cross-talk occurrence can be obtained by calculation and the phase pit pattern of the pre-format information of the change-over between the EVEN pattern and ODD pattern can be encoded. However, there can be an error (in general, not larger than 0.1%) that can introduce inaccuracies in this method of calculation.

In practice, an additional factor that makes it difficult to maintain accuracy is that the length of the phase pit P in the track direction is of the order of sub-micron, making it necessary to monitor the rotation of the master during exposure to nanosecond (ns) accuracy.

There exists a method of employing a push-pull signal (push-pull signal=differential signal) to read (reproduce) pre-format information formed with phase pits. The reproducing principle thereof is described referring to FIGS. 12A–13B. FIGS. 12A and 12B illustrate the waveform of a push-pull signal generated in the vicinity of a ladder-type phase pit P when the reproducing beam B traverses in the radius direction of the disc. The push-pull signal becomes a sinusoidal wave having a period equal to the track pitch TP. In the ladder-type portion, where the phase pit P exists, the shape of the cross section in the radius direction is asymmetrical at the sides of the track center shown by the dotted line. The center of the phase pit P shown by a dot-and-dash line in FIG. 12A is effectively shifted by a distance s in the radius direction from the track center of the groove G.

In the case of tracking along the groove G as shown in FIG. 13A, a peak of amplitude A occurs in the push-pull signal at the position of the phase pit P as shown in FIG. 13B. Therefore, if the presence or absence of the peak as shown by A is detected, the pre-format information formed by the phase pit P can be reproduced. FIG. 14 shows an example of the phase pit P that can be detected in this manner.

Where two phase pits P flank a groove G along the same radius, that is, the cross section position of the tracks Tr3 and Tr4 shown in FIG. 11B (refer to FIG. 15A), the shape of the cross section in the radius direction of the ladder-type portion does not become asymmetric, namely, no positional shift occurs at the center of the phase pit, as in apparent from the push-pull signal shown in FIG. 15B. The peak A does not appear in the push-pull signal in the case of reproducing the signal by performing the tracking control along the groove G in this case. Namely, in case the phase pits P exist at the same time on the lands L situated at the right and left sides of the groove G, there arises a problem that the pre-format information formed with the phase pit P cannot be detected reliably. Consequently, in order to solve the above-mentioned problem, even in the case of reproducing with a push-pull signal, it is necessary to prepare two types of pattern—EVEN for the even number and ODD for the odd number, of the pre-format information formed with the phase pits P and change over those patterns and use one of the patterns in the case of an arrangement generating the cross-talk.

Furthermore, when information is recorded in the groove G, the recording mark M can spread in the radius direction, through the delineation between the groove G and the land L. When recording is done in the vicinity of the phase pit portion formed as shown in the aforementioned published specification, the recording mark M can spread into the phase pit P formed on the land L as shown in FIGS. 16B–16D. Such protruding of the mark M can degrade the phase pit signal. In the case of FIGS. 16B through 16D the phase pit signal can be distorted and its signal amplitude lowered. As a result, the phase pit single P may not be detected reliably at the time of reproducing, and thereby the address information may not be reproduced.

One solution for detecting pre-format information formed with phase pits P even in case that the phase pits P exist at the same time on the lands L situated at the right and left sides of the groove G, is disclosed in the published specification of Japanese Laid-open Patent Publication No. 9-230696/1997. FIGS. 17A–17C show this. In FIG. 17A, the phase pit P is asymmetric in the radius direction. Namely, the phase pit P is not formed completely in the ladder-type shape and the length of the phase pit P is shorter than that of the tract pitch.

FIGS. 18A and 18B show an example of the signal waveform from the phase pit P. According to the proposed example, the optical information recording medium is constructed such that, even though the phase pit exists in the adjacent track(s), the track center of the phase pit and that of the groove G necessarily shifts by a distance s form each other. In such structure, the phase pit can be detected more reliably. However, even in the proposed case, the spreading of the above-mentioned recording mark M at the time of recording can cause problems.

Accordingly, this patent specification is directed to realizing an optical information recording medium which is not affected by cross-talk even when phase pits exist on the lands situated at the right and left sides of a groove and in which the address information, etc., encoded by phase pits can be reproduced reliably.

SUMMARY

It is an object of the approach disclosed in this patent specification to solve or alleviate those and other shortcomings in the background art.

It is another object to provide an optical information recording medium not affected by cross-talk even when phase pits exist on the lands situated at the right and left sides of a groove.

It is still another object to reliably reproduce address information encoded with phase pits.

It is still another object to improve a process of mastering grooves and phase pits.

BRIEF DESCRIPTION OF THE DRAWINGS

A more complete appreciation of the disclosure herein and many of the attendant advantages thereof will be readily obtained as the same becomes better understood by reference to the following detailed description when considered in connection with the accompanying drawings, wherein:

FIGS. 1A through 1C are views illustrating an optical information recording medium of an embodiment hereto, wherein FIG. 1A is a plan view of a portion of an optical information recording medium, FIG. 1B a cross-sectional view thereof at position 1, and FIG. 1C a cross-sectional view thereof at position 2;

FIG. 4 illustrates a relationship between the width of a phase pit and the amplitude of a phase pit signal;

FIG. 5 illustrates a relationship between the length of a phase pit and the amplitude of a phase pit signal;

FIGS. 6A through 6D illustrate a method of exposing a master to form phase pits, wherein FIG. 6A is a plan view of the a portion of the master, FIG. 6B illustrates an exposing light beam, FIG. 6C is a cross-sectional view at location 1 in FIG. 6A, and FIG. 6D is a cross-sectional view at location 2 in FIG. 6A;

FIG. 7 illustrates the spot diameters of two light beams and the spot distance therebetween;

FIG. 8 illustrates an optical system for exposing a master;

FIG. 11A through 11C illustrate a background-art optical information recording medium, wherein FIG. 11A is a plan view of a portion of an optical information recording medium, FIG. 11B is a cross-sectional view at location 1 in FIG. 11A, and FIG. 11C is a cross-sectional view at location 2 in FIG. 11A;

FIGS. 12A and 12B illustrate a principle of reproducing (reading) a phase pits, wherein FIG. 12A is a plan view of a optical information recording medium and FIG. 12B is a waveform diagram of a push-pull signal;

FIGS. 13A and 13B illustrate a principle of reproducing a phase pit with a tracking operation, wherein FIG. 13A is a plan view of optical information recording medium and FIG. 13B is a waveform diagram of a push-pull signal;

FIGS. 14A and 14B illustrate a relationship between a phase pit and the waveform of a phase pit signal, wherein FIG. 14A is a plan view of an optical information recording medium and FIG. 14B is a waveform diagram of a push-pull signal;

FIGS. 15A and 15B illustrate a case in which it is difficult to read (reproduce) a phase pit, wherein FIG. 15A is a plan view of an optical information recording medium and FIG. 15B is a waveform diagram of a push-pull signal;

FIGS. 16A through 16D illustrate a distortion of the signal waveform from a phase pit caused by protruding of a recording mark;

FIGS. 17A through 17C illustrate an optical information recording medium which has been already proposed, wherein FIG. 17A is a plan view of the optical information recording medium, FIG. 17B is a cross-sectional view at location 1 in FIG. 17A, and FIG. 17C is a cross-sectional view at location 2 in FIG. 17A.

DETAILED DESCRIPTION OF PREFERRED EMBODIMENTS

Figure 1A:
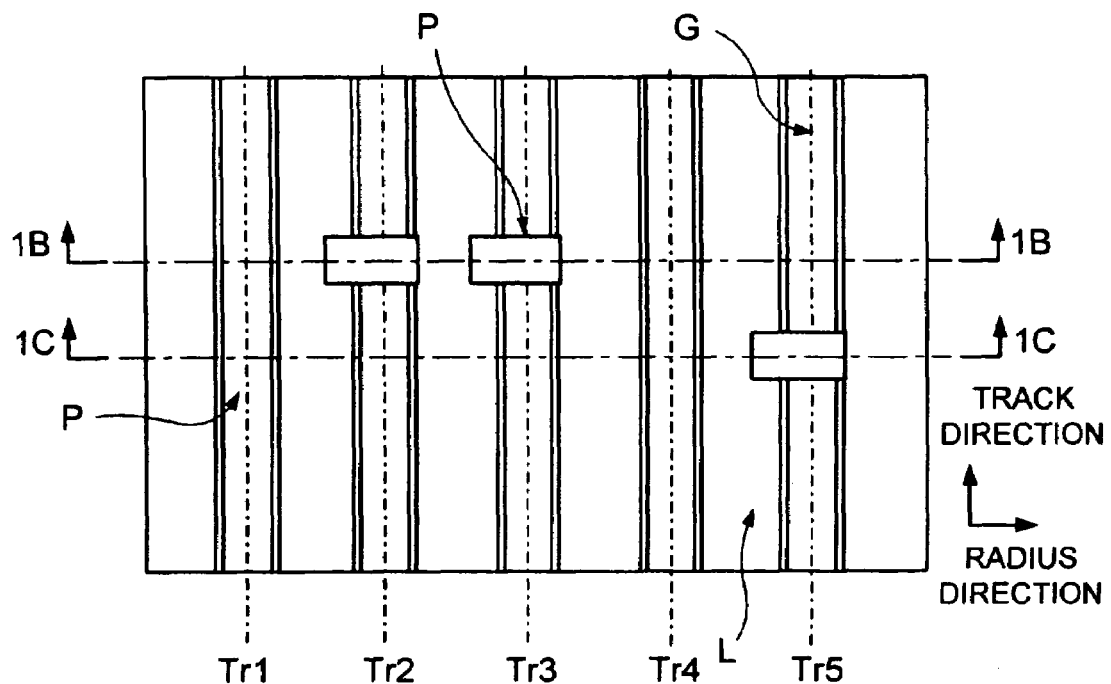
Figure 1B:
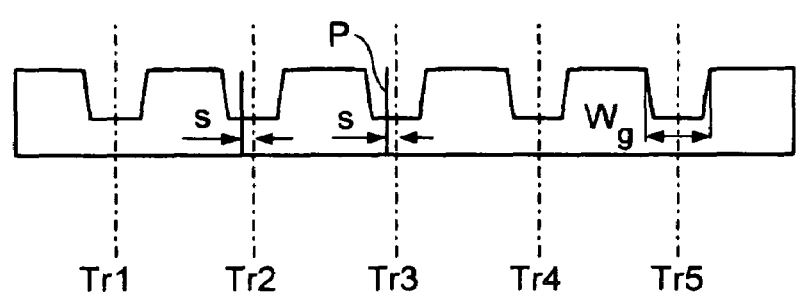
Figure 1C:
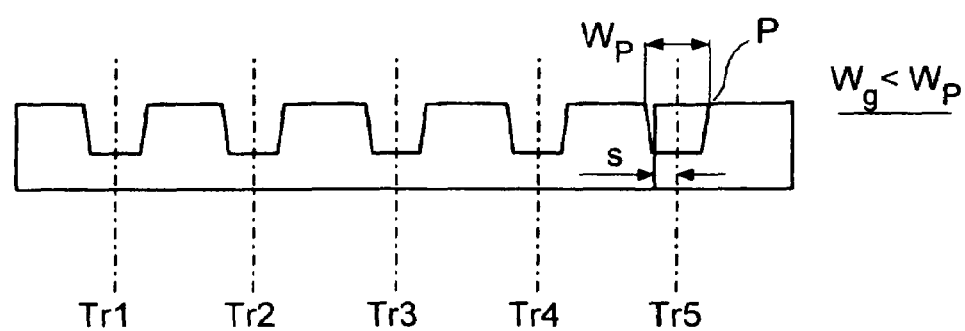

Preferred embodiments are described hereinafter, referring to the accompanying drawings.

A first feature of the disclosure herein relates to an optical information recording medium in which an information recording portion on a track is in the form of a groove and pre-format information is formed as phase pits, wherein a phase pit encoding preformat information for a groove has the same depth as the groove but is spaced radially from that groove and is connected, to an adjacent groove.

In such structure, a partition wall exists between a groove and the phase pit encoding preformat information for that groove. Therefore, the groove is not connected to its phase pit. Consequently, even if phase pits exist on the lands directly to the right and left of the groove, no significant cross-talk exists. In addition, owing to the effect of the partition wall, the phase pit signal is not degraded by information marks.

A second feature relates to an optical information recording medium as described above, in which the width Δ of the partition wall in the radius direction of the track and the track pitch TP satisfy the relationship represented by the following inequality:

$\Delta/TP \leq 0.1$.

When the width Δ for the partition wall in the radius direction is thus set to a value that can curtail the spreading of a recording mark, the partition wall can eliminate or reduce deterioration of the phase pit signal in a recording operation.

A third feature relates to an optical information recording medium as described above, in which the width Wp of a phase pit, the length Lp of said phase pit in the circular circumferential direction thereof, the track pitch TP, and the spot diameter BD of a recording/reproducing light beams satisfy the relationship represented by the following inequalities:

$Lp/BD < 1.0$, and $0.8 \leq WP/TP \leq 0.9$.

When the width Wp of a phase pit is thus set to a value allowing a sufficiently large signal amplitude for the phase pit, the phase signal can be reliably obtained and address information can be correctly reproduced.

A fourth feature relates to an optical information recording medium as described above, in which the width Wp of a phase pit, the length Lp of the phase pit in the circular circumferential direction thereof, the track pitch TP, and the spot diameter BD of a recording/reproducing light beams satisfy the relationship represented by the following inequalities:

$1.0 \leq Lp/BD$, and $0.5 \leq WP/TP \leq 0.8$.

When the length LP of the phase pit in the circular circumferential direction is thus set tp a value such that a sufficiently large signal amplitude can be taken for the phase pit, the phase pit signal can be obtained reliably and address information can be correctly reproduced.

A fifth feature relates to an optical information recording medium as described above, in which the width Wp of a phase pit, the length Lp of the phase pit in the circular circumferential direction thereof, the track pitch TP, and the spot diameter BD of a recording/reproducing light beams satisfy the relationship represented by the following inequalities:

$1.0 \leq Lp/BD$, and $0.8 \leq WP/TP \leq 0.9$.

When the width Wp of a phase pit and the length Lp thereof in the circular circumferential direction are thus set to values such that a sufficiently large signal amplitude can be taken for the phase pit, the phase pit signal can be obtained and reliably address information can be correctly reproduced.

A sixth feature relates to a method of mastering a groove and a phase pit in an optical information recording medium as described above in which, at the time of mastering the groove and the phase pit, first and second exposing light beams respectively for use in both of the groove and the phase pit are used, and in which, assuming that the spot diameter of the first exposing light beam for use in the groove is BD1, the spot diameter of the second exposing light beam for use in the phase pit is BD2, the distance between the first and second exposing light beams is L, and the width of a partition wall in the radius direction for the optical information recording medium is Δ, those factors, BD1, BD2, L, and Δ satisfy the relationship therebetween by the following equality:

$\Delta = L - (BD1/2) + (BD2/2)$.

Using this relationship the width Δ of the partition wall in the radius direction can be adjusted so as to take an optional value in the mastering process.

A seventh feature invention relates to a method of mastering a groove and a phase pit in connection with the sixth feature, in which both of the values of the spot diameters BD1 and BD2 of the first and second exposing light beams are respectively fixed to constant values, and in which the distance L between the spots of the first and second exposing light beams is adjusted by changing an incident angle of one or both exposing light beams directed to an object lens by use of a light deflection element.

In this manner, an adjustment changing the width Δ of the partition wall in the radius direction can be done easily and with high precision.

Broad Concept of Embodiments

The broad concept of the embodiments is described hereinafter. The reference symbol of the groove employed as the optical information recording track is G, the land between the grooves G is L, and the phase pit representing pre-format information is P. Furthermore, the groove width of the groove G is Wg, and that of the phase pit P is Wp.

Figure 17A:
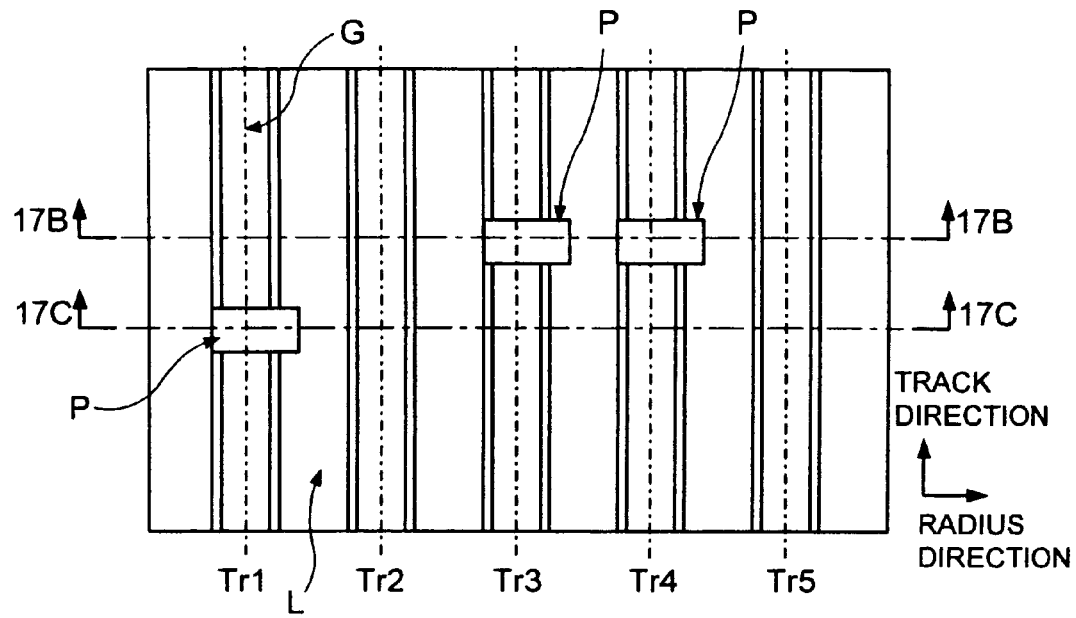
Figure 17B:
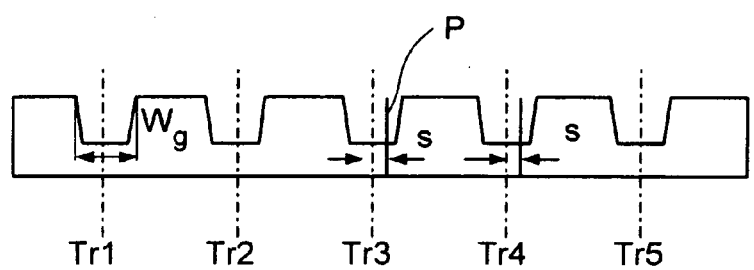
Figure 17C:
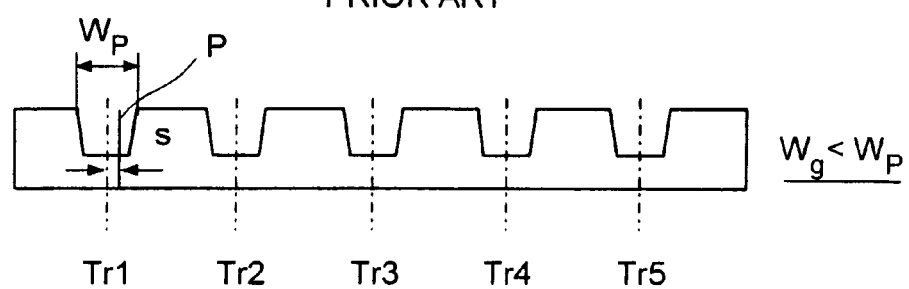

In the optical information recording medium of the embodiments disclosed herein, a phase pit P is not formed completely in the shape of ladder, but is formed shorter in the radial directory than the track pitch. In such way, the track center of the phase pit P is shifted by a distance s from that of a groove G. Namely, the structure of the present embodiment physically similar to that of the optical information recording medium of FIG. 17, which has been already proposed.

Figure 18A:
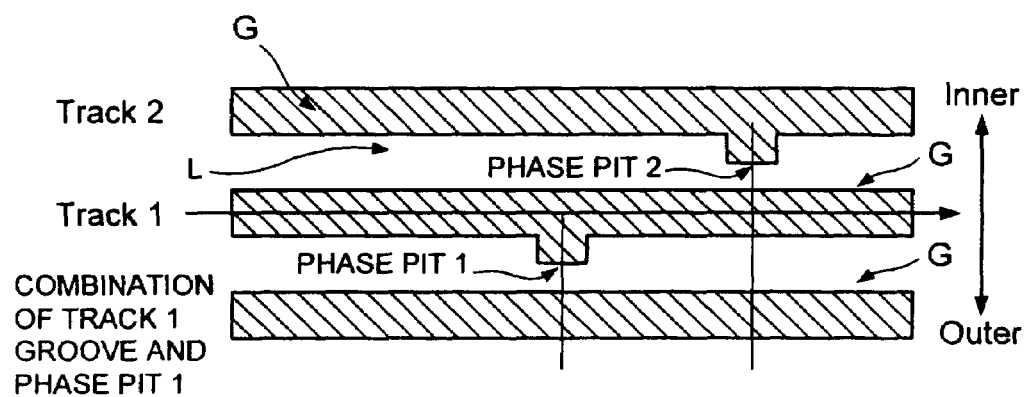
FIGS. 18A and 18B illustrate a relationship between a phase pit and the waveform of a phase pit signal.

However, in the present embodiments as shown in FIG. 2, groove G of track 1 to be recorded and reproduced is not physically connected, in the radius direction, to phase pit 1 pertaining to track 1. Instead, there exists a partition wall 1 and the phase pit 1 is formed such that the phase pit 1 is physically connected to the adjacent groove G of track 3. In the case of the proposed example as shown in FIG. 18A, groove G of track 1 to be recorded or reproduced is physically connected, in the radius direction, to phase pit 1 that encodes information for track 1. There still exists a partition wall between the grooves G of adjacent tracks. However, the direction and meaning of the phase pit P in the radius direction of the present embodiments is reversed as compared to the proposed example of FIG. 18A.

Figure 2A:
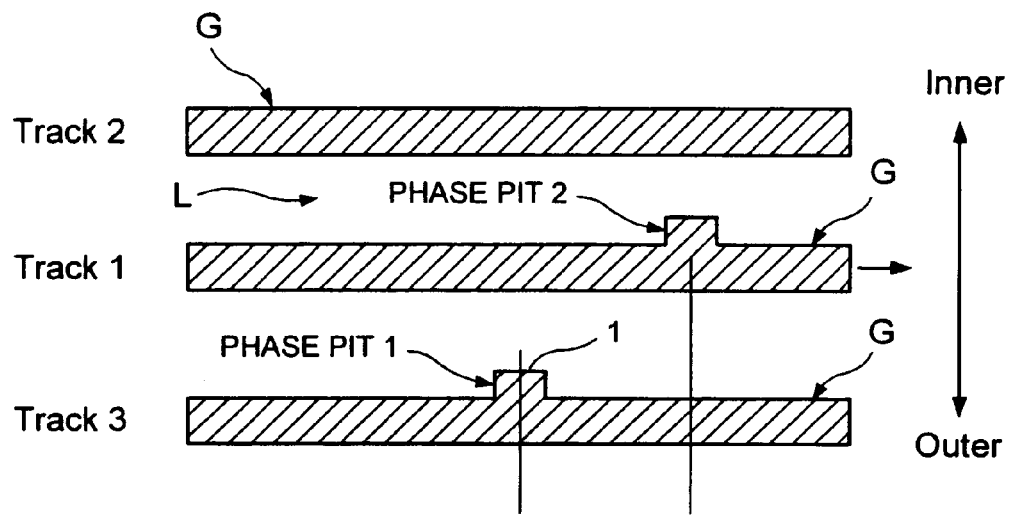
FIGS. 2A and 2B illustrate a relationship between a phase pit and a phase pit signal waveform.
Figure 2B:
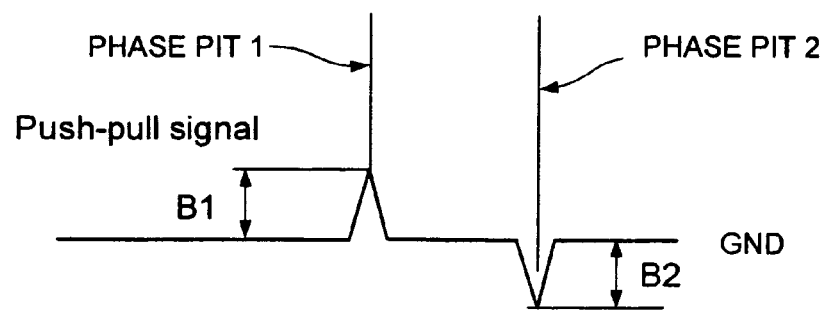

When reproducing information from track 1 in the direction shown by the arrow at track 1 in FIG. 2, the peaks of the push-pull signal (FIG. 2B) generated from the phase pit P have the same polarity as in the proposed example shown in FIG. 18. The polarity of a peak is determined by whether the phase pit P is at the right side or at the left side of the groove G. Therefore, even if there are radially aligned phase pits P at the right and left sides of a groove G, it is possible to detect the pre-format formed information encoded by those phase pits P.

Figure 3A:
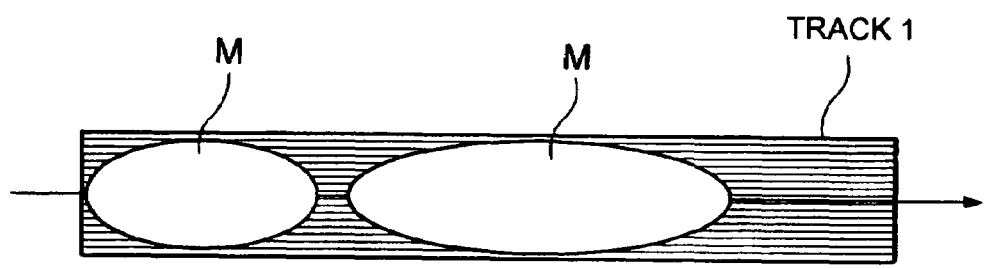
FIGS. 3A and 3B illustrate the effect of a partition wall.
Figure 3B:
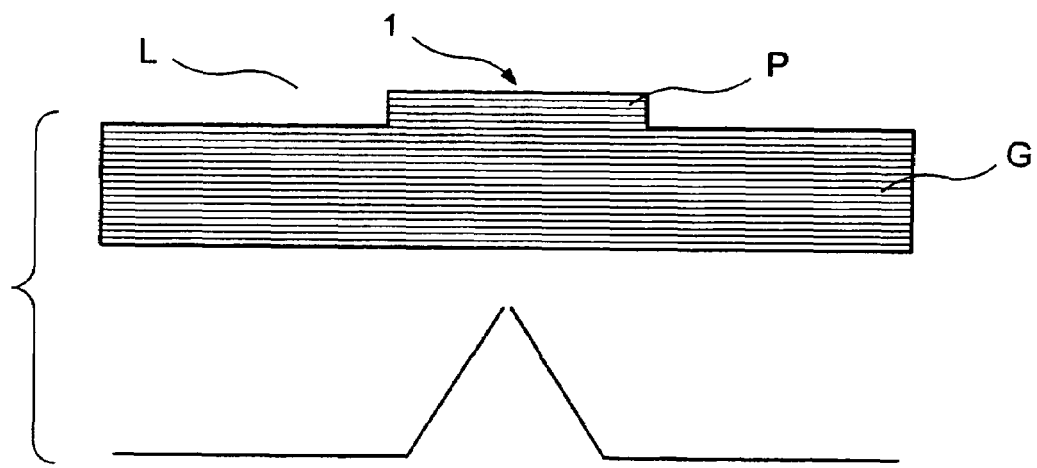

Furthermore, of the partition wall 1 helps keep the recording mark M recorded on groove G of track 1 from spreading to the side of the phase pit 1 that encodes address information for track 1, as shown in FIG. 3. The recording mark M does not protrude to the side of the phase pit P as in the case of FIGS. 16B–16D. In FIG. 2, when recording a mark on groove G of track 3, the recording mark can protrude into phase pit 1. However, since the diameter of the reproducing light beam is nearly equal to the track pitch TP, the recording mark portion protruding into the phase pit 1 at the time of reproducing track 1 is at the bottom portion of phase pit 1, where the intensity of the reproducing light beam is at or close to zero. Consequently, signal leakage from adjacent tracks (cross-talk signal) is unlikely or low, and therefore there is little or no deterioration of the phase pit signal, unlike the case shown in FIGS. 16B through 16D. In such way, according to the present embodiment, the partition wall 1 prevents deterioration of the phase pit signal and a reliable phase pit signal can be obtained. Thereby, address information can be correctly reproduced.

Some implementation examples of the fundamental structure according to such embodiments as described above are described hereinafter.

EXAMPLE 1

When the groove G and the phase pit P are disposed according to the present embodiment as shown in FIG. 2A as well as in the proposed example shown in FIG. 18A, when track 1 is reproduced, the polarities of the peaks of the push-pull signals respectively occurring from the phase pit 1 and the phase pit 2 opposite each other, namely, positive and negative. In the arrangement of FIG. 18A, where the groove of the reproducing track and the phase pit for that track are connected to each other, namely, the phase pit 1 is located near to the track center of the groove G of track 1, the peak value (amplitude of the phase pit signal) becomes larger.

Assuming that the amplitude of the phase pit 1 signal is A1 and that for the phase pit 2 signal is A2 in FIGS. 18A and 18B, the relationship therebetween is as follows:

$A1<A2$.

On the other hand, in FIGS. 2A and 2B showing the present embodiment, assuming that the amplitude of the phase pit 1 signal is B1 and that of the phase pit 2 signed is B2, the relationship therebetween is as follows:

$B1<B2$.

Namely, the relationships of the signal amplitudes on both occasions of FIG. 18 and FIG. 2 are reversed.

Assuming that the sizes of the groove depth and the groove width concerning the groove G and the phase pit P are the same in FIG. 2A and in FIG. 18A, the respective values A1, A2, B1, and B2 satisfy the following equalities:

$A1=B2$, and $A2=B1$.

Furthermore, assuming that the track to be recorded or reproduced is the track 1, the respective values of A1 and B1 satisfy the following inequality:

$A1>B1$.

In such way, in the case of the present embodiment (FIG. 2A), since the phase pit P is further in the radius direction from the track center of the groove G to be recorded or reproduced, than in the case of FIG. 18A, the amplitude of the phase pit P signal could becomes lower, than in the case of FIG. 18A.

FIG. 4 compares the respective amplitudes of the phase pit signals in the cases of FIG. 18A (proposed example; background system 2) and FIG. 2A (present embodiment), in a case when the length Lp of the phase pit P in the circumferential direction and the spot diameter BD of the light beam used in recording or reproduction of information satisfy the following equality:

$Lp/BD=0.5$.

The amplitude of the phase pit signal shown in FIG. 4 represents a numerical value standardized by dividing the value B1 of the push-pull signal output shown in FIG. 2B by the addition (sum) signal Rf.

Figure 18B:
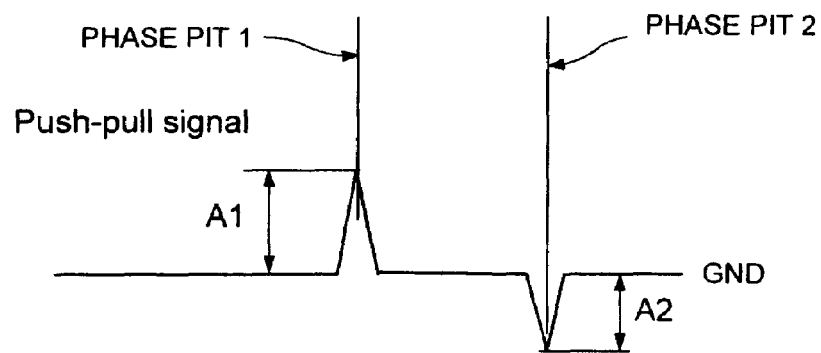

When the phase pit P is not completely connected to the groove G (WP/TP<1), the amplitude of the phase pit signal is less in the case of the present embodiment (FIGS. 2A and 2B) than in the proposed example (FIGS. 18A and 18B).

According to FIG. 4, the amplitude of the phase pit signal is highest when the phase pit is connected to the adjacent groove (WP/TP=1) in the case of FIG. 2A. When a partition wall 1 keeps the recording mark M from spending (the area of WP/TP<1), the amplitude of the phase pit signal is lowered. In experiments, it has been confirmed that, if the width $\Delta$ of the partition wall 1 in the radius direction (refer to FIG. 6A) satisfies, at least, the relationship of $\Delta/TP=0.1$ (WP/TP=0.9), undesirable spreading of the recording mark M can be prevented.

In the present embodiment, if $\Delta$ and TP are set close to $\Delta/TP=0.1$, it is apparent from FIG. 4 that the difference between the phase pit signal amplitudes at the vicinity of WP/TP=0.9 is not so large, compared with the case of FIG. 18A. As a result, the lowering of the phase pit signal amplitude can be made substantially insignificant in the present embodiment.

EXAMPLE 2

As described in the example 1, if the values Wp and TP are set close to satisfying the relationship; WP/TP=0.9, the lowering of the phase pit signal amplitude can be abbreviated.

However, when the width $\Delta$ of the partition wall 1 is very small, it can be difficult to reliably form the groove in the mastering process. From the viewpoint of the ease of mastering, it is preferable to set these dimensions close to satisfying the equation;

$WP/TP=0.6\sim0.9$.

As seen from FIG. 4, the amplitude reduction of the phase pit signal is apparent in the range WP/TP=0.6~0.9. Therefore, it is desirable to take the countermeasure to compensating for this reduction. To this end, setting of $Lp/Bd \geq 1.0$ can help. This is described in more detail referring to FIG. 5. Taking the case of WP/TP=0.7 as an example, the graph of FIG. 5 illustrates the amplitude variation of the phase pit signal when changing the ratio between the length Lp of the phase pit P in the circular circumferential direction and the spot diameter BD. The amplitude of the phase pit signal in FIG. 5 shows the standardized numerical value obtained by dividing the output value B1 of the push-pull signal in FIG. 2B by the value Rf of the addition (sum) signal. According to the graph, a phase pit signal of high amplitude can be reliably obtained by setting $Lp/BD \geq 1.0$. Therefore, the problem of lowering of the phase pit signal amplitude can be alleviated. Furthermore, and replication mastering processes can be easier, and the manufacturing process yield for the optical information recording medium can be increased.

EXAMPLE 3

In consideration of those points as mentioned heretofore, in order to keep the amplitude of the phase pit signal high, it is preferable to combine both of the conditions: WP/TP=0.9 (Example 1) and Lp/BD≧1.0 (Example 2). However, this could make the manufacturing tolerances for the mastering process tight. In this example 3, the mastering method (method of exposing the original board) is improved by adjusting the width Δ of the partition wall 1 with high precision, as illustrated in FIGS. 6A–6D and FIG. 7.

Figure 6:
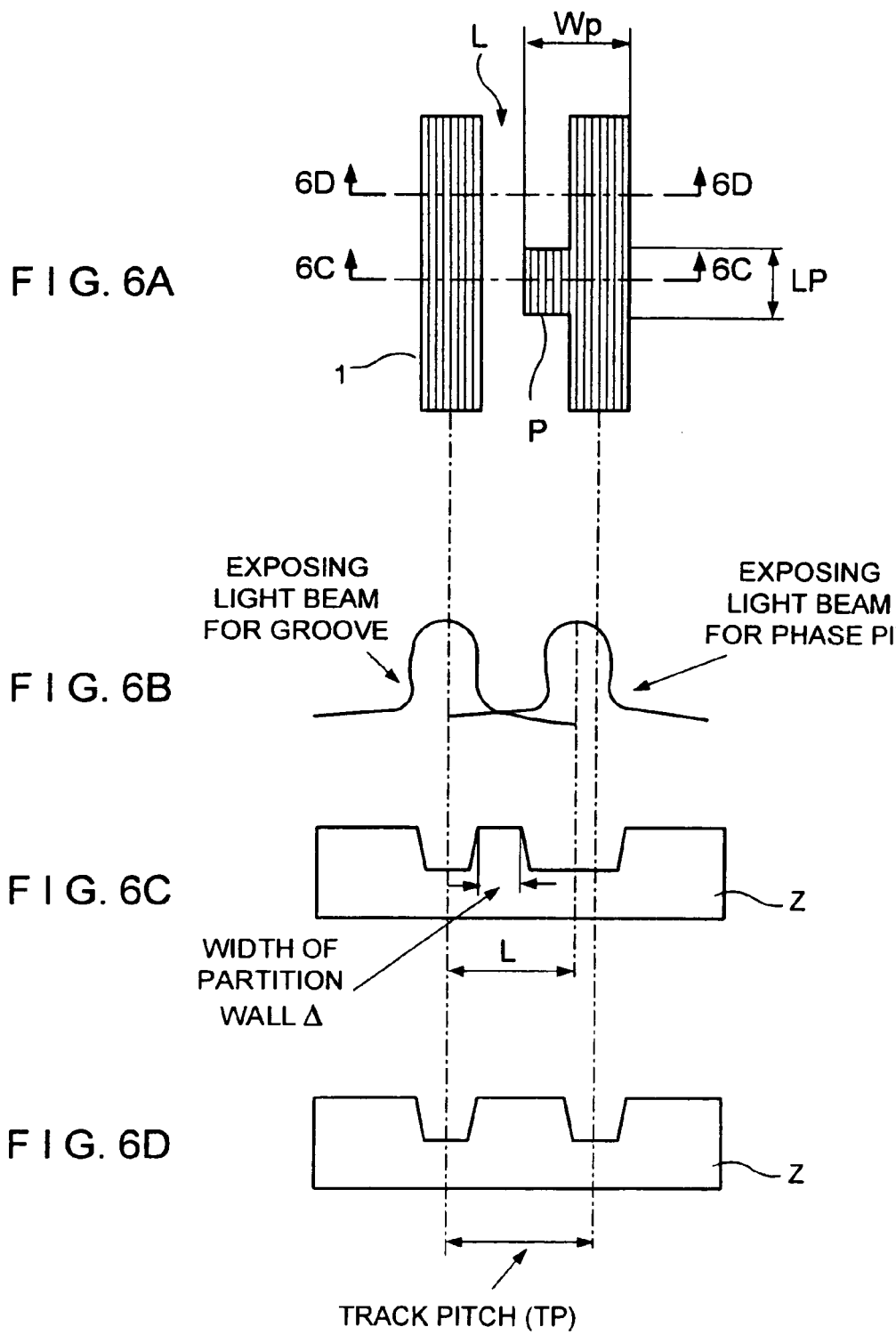

In FIG. 6A, cross section 1 is where groove G and the phase pit P exist, and cross section 2 is where only the groove G exists. In the area where the groove G and the phase pit P exist, the resist on the master is exposed by using, at the same time, two exposing light beam: an exposing light beam for the groove and an exposing light beam for the phase pit. In the area where only the groove G exists, the resist on the master is exposed by using only the exposing light beam for the groove. Assuming that the width of the partition wall in the radius direction is Δ, the distance between the centers of the two exposing light beam spots is L, the diameter of the light beam spot for the groove is BD1, and that of the light beam spot for the phase pit is BD2 (refer to FIG. 7), since the groove width formed by the mastering is almost equal to the diameter of the light beam spot for exposing the original board, the above factors; Δ, L, BD1, and BD2 satisfy the following equation:

$$\Delta = L - (BD1/2) + (BD2/2).$$

From the above equation, it can be understood that the diameters BD1 and BD2 of the exposing light beams respectively for the groove and the phase pit and the distance L therebetween are suitably selected. The equation representing the above relationship can be applied to the aforementioned devising examples 1 and 2.

For better manufacturing, it is desirable to make it possible to adjust the width Δ of the partition wall 1 with high accuracy. Generally, in order to adjust the diameter of the laser beam spot, there has been proposed a method of changing the diameter of the light beam directed to the object lens as incident light.

The exposing optical system as shown in FIG. 8 is constructed such that the light beam emitted from a laser light source 3 is divided into the exposing light beam for the groove and exposing light beam for the phase pit by use of a polarization beam splitter 4, and thereafter the exposing light beam for the groove is directed onto the resist firm 9 on a master 2 via a beam expander 5, deflection prisms 6 and 7, and an object lens 8, while the exposing light beam for the phase pit is directed onto the resist film 9 of the master 2 via another beam expander 12, deflection prisms 6 and 7 and another deflection prism 13, and the object lens 8 after passing through a deflection prism 10 and a light modulator 11.

In such structure as mentioned above, the diameter of the light beam is increased or decreased utilizing the element(s) such as the beam expanders 5 and 12. However, in such structure it is difficult to improve the accuracy of adjusting the width A of the partition wall 1 due to large influence by the shift of the optical axis of the laser beam. Regarding this point, in example 3, the values of the spot diameters BD1 and BD2 of the two exposing light beams are fixed, and a light deflection element 14 is interposed in the optical path of one of the exposing light beams. For instance the element 14 can be at the side of the exposing light beam for the groove, as shown in FIG. 8, or element 14 can be at the side of the exposing high beam for the phase pit. In such structure, the incident angle of the light beam to the object lens 8 can be changed and thereby the distance L between the spots can be adjusted. According to such structure, only by changing the value of the voltage applied to the light deflection element 14, the width of the partition wall 1 can be adjusted simply and with high accuracy.

Specific Embodiments

A method of manufacturing the optical information recording medium based on the above-mentioned explanation and the medium manufactured as the result in accordance with the manufacturing method thereof are described hereinafter as two (first and second) specific embodiments.

First Embodiment

Generally, the plastic substrate of such optical information recording medium is mass-reproduced (replicated) by the injection molding method using a metal mold called "stamper". The stamper can be manufactured in accordance with the stamper manufacturing process (mastering) as shown in FIG. 9A-9F. A photo-resist film 9 is applied (painted) and baked on a glass base plate 15. In such way, the resist master (original board) 2 is manufactured. (Refer to the resist original board manufacturing process shown in FIG. 9A). Next, a latent image is formed by exposing the resist master with the focused laser beam, e.g., an Ar laser 3 in FIG. 8 (Refer to the original board exposing process shown in FIG. 9B). The exposed resist master 2 is developed, forming a groove pattern 16 in the photo resist firm 9. (Refer to the developing process shown in FIG. 9C). A Ni-film is sputtered on the surface of the resist original board 2 having the groove pattern 16 formed in the photo resist film 9 and thereby an electrically conductive film 17 is formed thereon. (Refer to the conductive film operating process shown in FIG. 9D). Ni is laminated on the conductive film 17 and thereby the Ni electroforming plate 18 is formed thereon. (Refer to the Ni electroforming process shown in FIG. 9E). The Ni electroforming plate 18 is completed as a stamper 19 through the processes of cleaning, rear surface polishing, inner and outer diameters processing (final processing), etc. (Refer to the processes of peeling off, cleaning, rear surface polishing, and final processing shown in FIG. 9F).

Figure 9A:
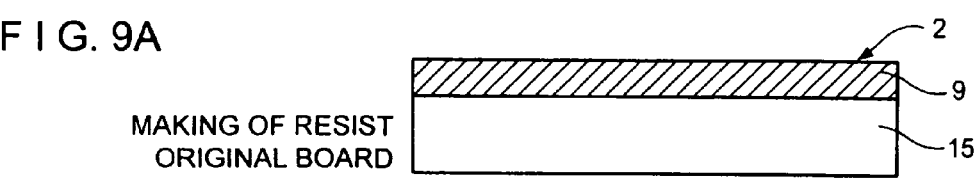
FIGS. 9A through 9F are process diagrams illustrating a stamper manufacturing process.
Figure 9B:
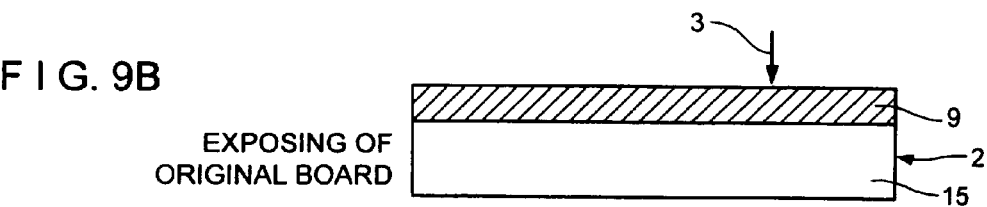
Figure 9C:
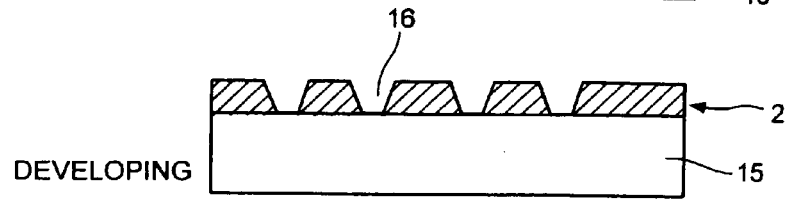
Figure 9D:
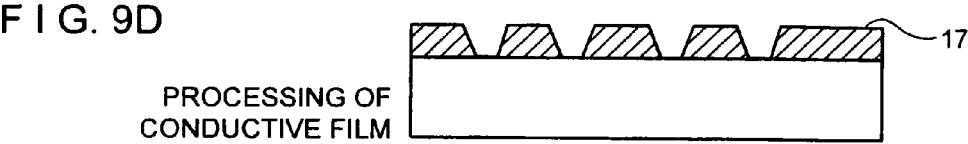
Figure 9E:
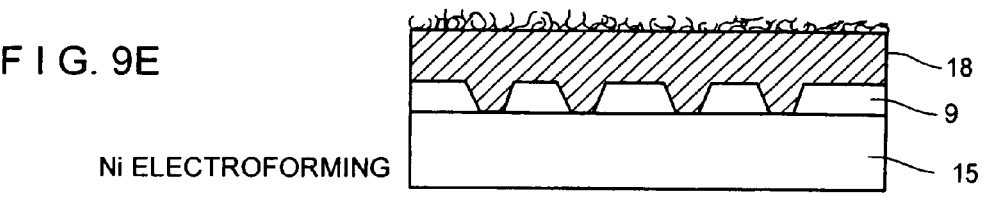
Figure 9F:
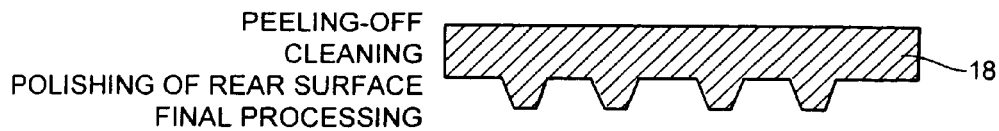
Figure 10:
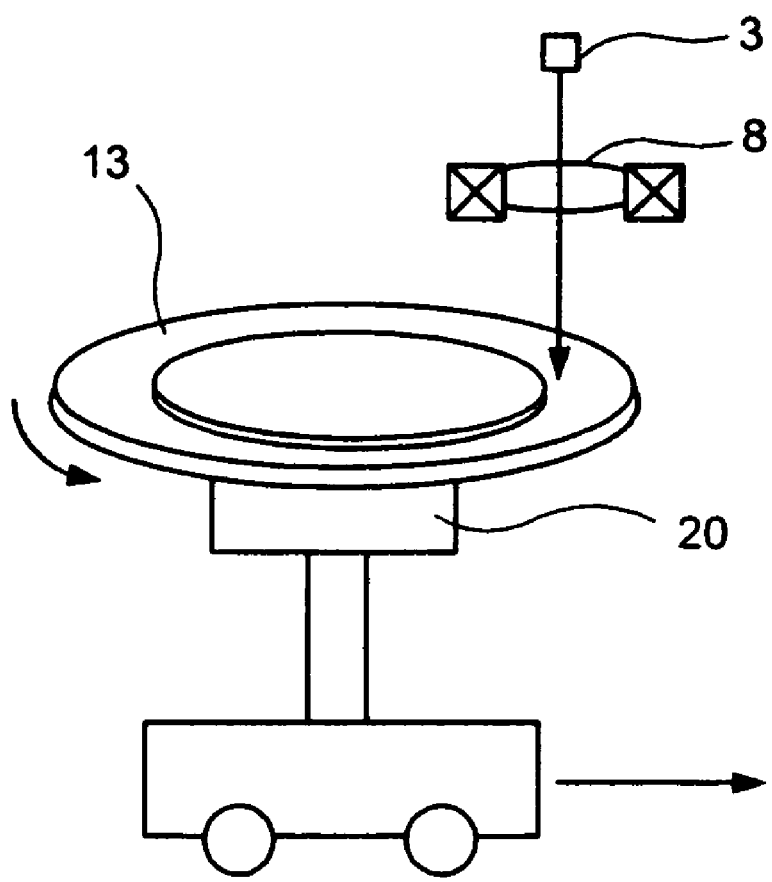
FIG. 10 is a perspective view, illustrating exposing a master (original board)
Figure 11A:
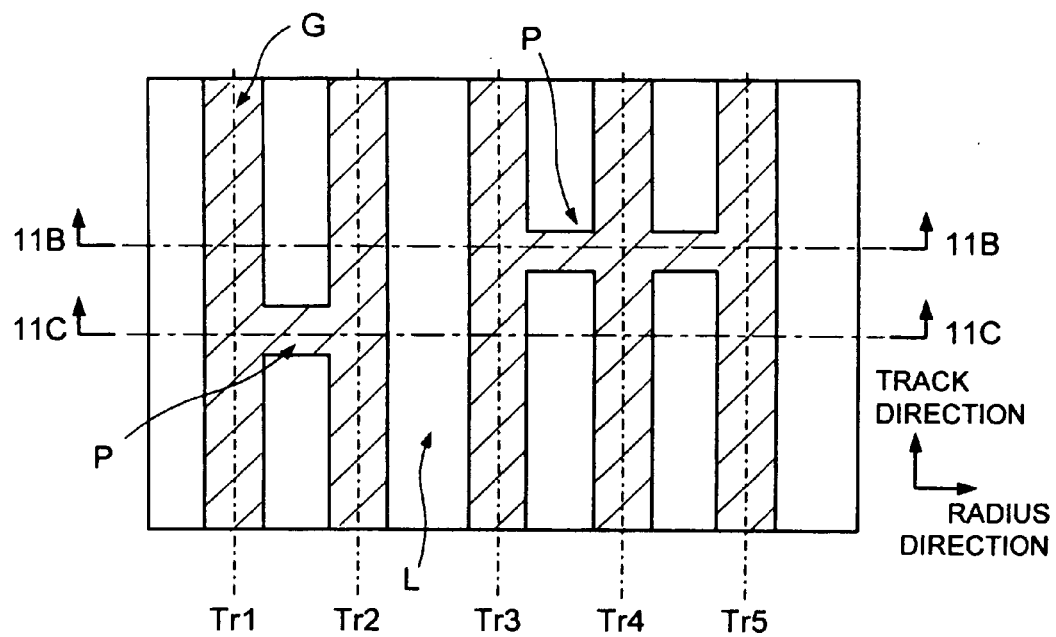
Figure 11B:
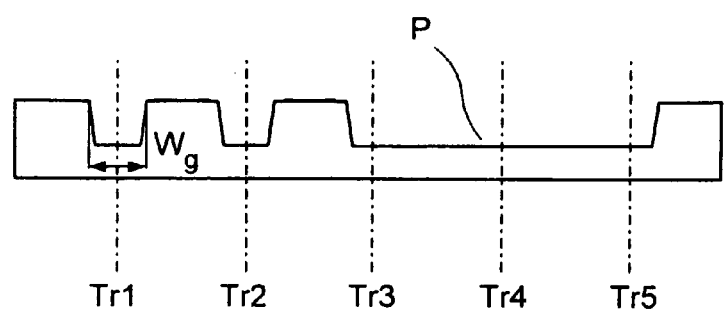
Figure 11C:
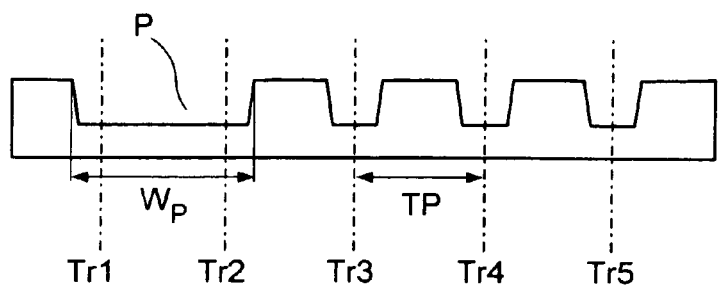
Figure 12A:
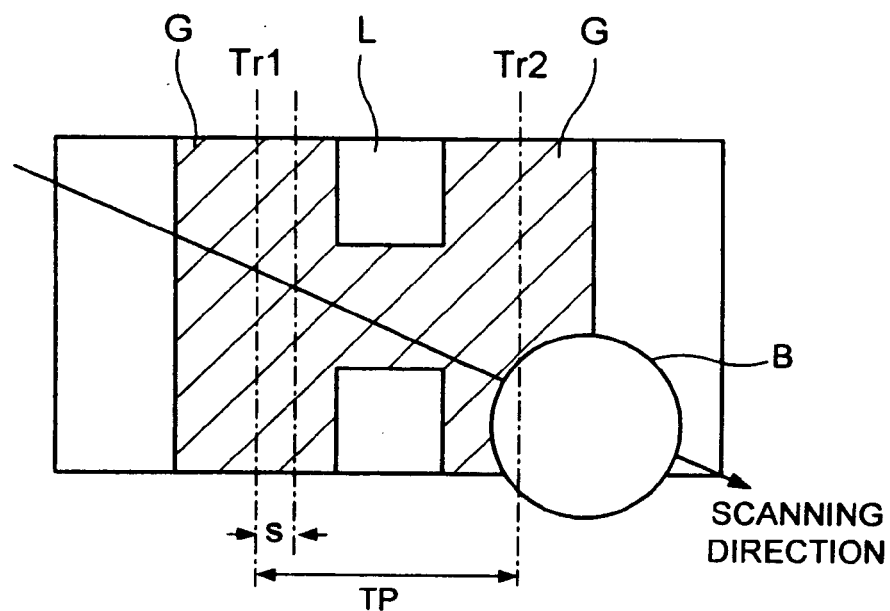
Figure 12B:
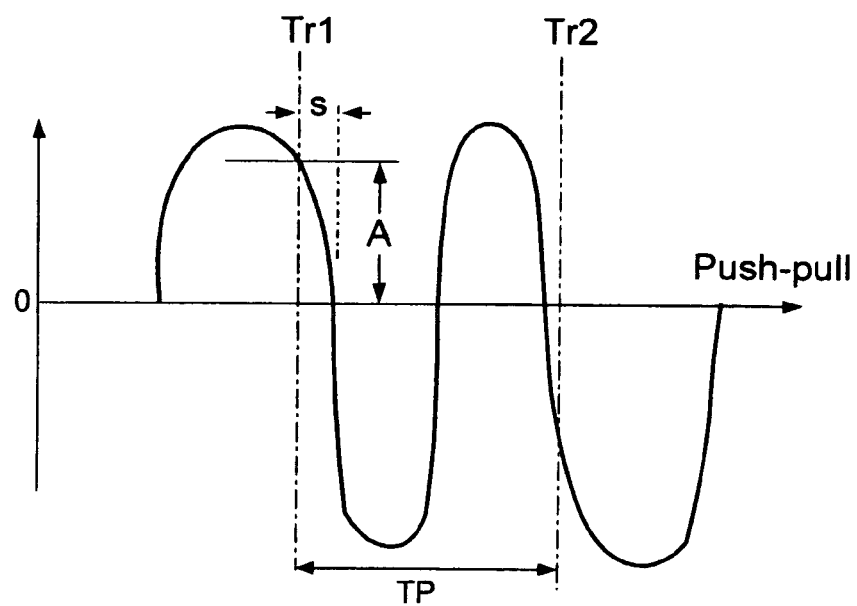
Figure 13A:
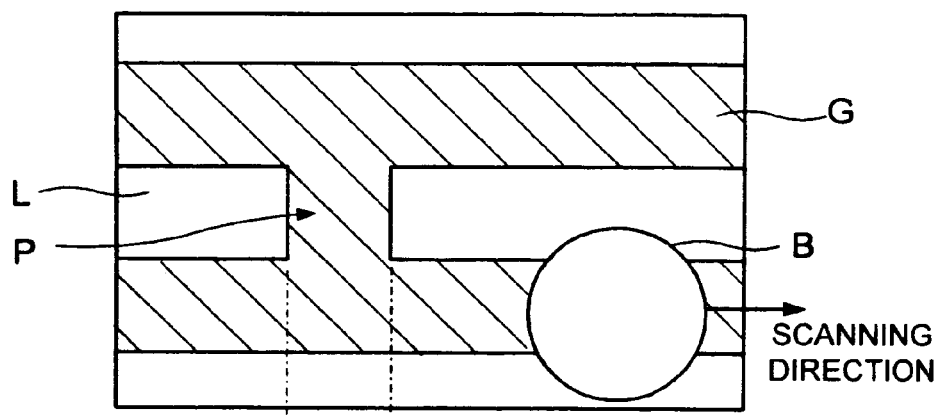
Figure 13B:
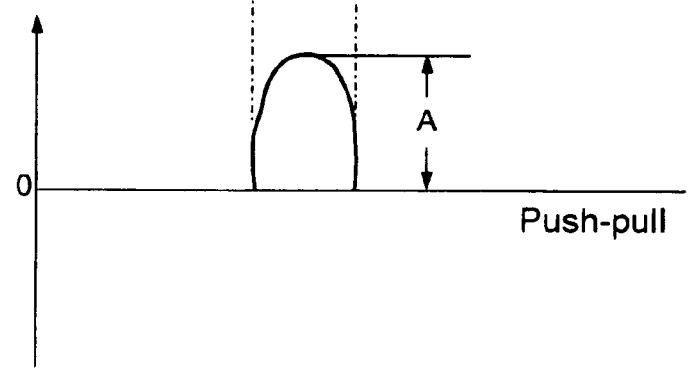
Figure 15A:
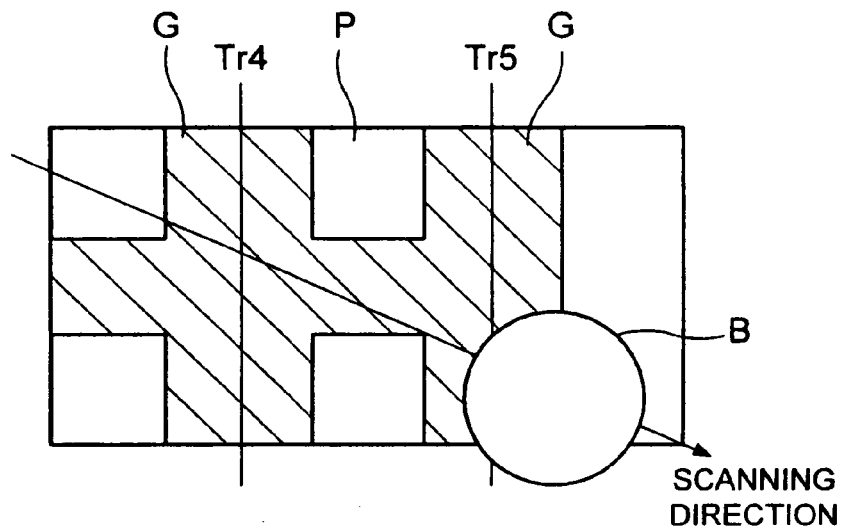
Figure 15B:
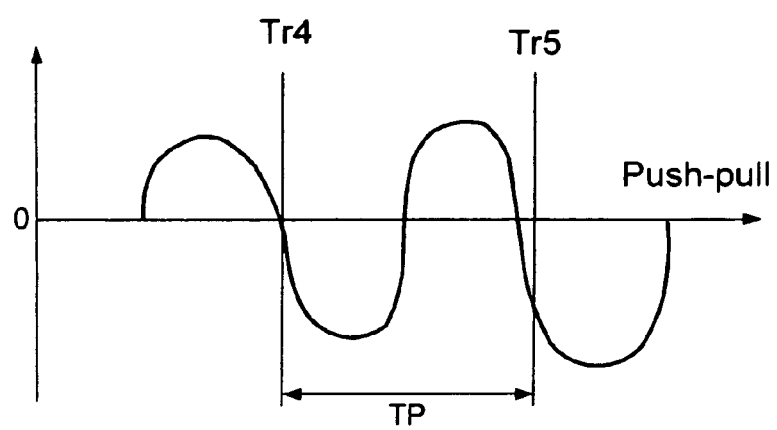

A model of the master exposing process in FIG. 9B is shown in FIG. 10. For exposing, the master 2 is rotated by turntable 20 and transversely conveyed, and the laser beam of the Ar laser 4 is focused and radiated on the resist master 2. Thereby, the groove pattern 16 for the groove is formed as a spiral. The reference numeral 8 represents an object lens.

When exposing a master based on such principle to form the groove G including the phase pit P as shown in examples 1, 2 and 3 of the aforementioned first embodiment, respective exposing light beams for the groove and the phase pit are employed as illustrated in FIG. 8. Those two exposing light beams are arranged so as to shift them in the radius direction as desired, and to keep them focused on the resist master 2 at the same time in order to expose the master. At the time of exposing the master, address information corresponding to the groove being exposed is recorded by the phase pit exposed at the same time. Because a continuous groove in the form of a spiral is formed, the exposing light beam for the groove is continuously radiated on the resist master 2. On the other hand, the exposing light beam for the phase pit is intermittently radiated only on the parts of the master where the phase pits P are arranged. Namely, the exposing light beam for the phase pit is on-off controlled by light modulator 11.

Utilizing such method, the optical information recording medium as described in the example 2 was manufactured in an experiment and the medium thus manufactured was evaluated. In the experiment, the groove depth of the groove G and the phase pit P is set at about 600 A, the groove width Wg of the groove G about 0.3 µm, the groove width WP of the phase pit P about 0.5 µm, the length Lp of the phase pit P in the circular circumferential direction about 1 µm, the track pitch TP 0.74 µm, and the width Δ of the partition wall 1 in the radius direction about 0.2 µm. The wavelength of the semiconductor laser for use in recording/reproducing is set to 635 nm, the numerical aperture NA+0.60, and the diameter of the beam spot for use in recording/reproducing about 0.8 µm. The recording material for the optical information recording medium is a phase-change material (Ag In SbTe). Regarding such optical information recording medium, an intensity of about 0.2 is obtained as the amplitude of the phase pit signal. After the recording operation, it was confirmed that there exists no distortion in the waveform of the phase pit signal amplitude. Therefore, address information can be reliably reproduced.

Second Embodiment

Here, a practical mastering is described hereinafter, in the case of the example 3. The groove depth of the groove G and the phase pit P is set to about 600 A, the groove width Wg of the groove G about 0.3 µm, the groove width Wp of the phase pit P about 0.65 µm, the length Lp of the phase pit P in the circular circumferential direction about 1 µm, the track pitch TP 0.74 µm, and the width Δ of the partition wall 1 in the radius direction about 0.1 µm.

For mastering, the spot diameter BD1 of the exposing light beam for the groove and the spot diameter BD2 of the exposing light beam for the phase pit are set to values (about 0.3 µm) approximately equal to each other, and the spot distance L between the exposing light beams is set to about 0.4 µm. The wavelength of the semiconductor laser for use in recording/reproducing is set to 635 nm, the numerical aperture of the object lens 8 is set to NA=0.60, and the spot diameter of the light beam for use in recording/reproducing about 0.8 µm. The recording material for the optical information recording medium is a phase-variation material (Ag In Sb Te). Regarding such optical information recording medium, an intensity of about 0.35 is obtained as the amplitude of the phase pit signal. After the recording operation, it was confirmed that there exists no distortion in the waveform of the phase pit signal amplitude. Therefore, the address information can be stably reproduced.

As is apparent from the foregoing description, the following advantageous functional effects can be obtained according to the first through seventh features discussed above. Those effects are described hereinafter individually in more detail.

According to the first feature, there exists a partition wall in the track between the a groove and a phase pit encoding information for the groove, and thereby the groove and the phase pit for it are not directly connected to each other. Consequently, even though there may be phase pits on the lands at the right and left sides of the groove, cross-talk is avoided. Furthermore, due to the effect of the partition wall, the phase pit signal after the recording operation does not deteriorate, and thereby a reliable phase pit signal can be obtained and address information can be correctly reproduced.

According to the second feature, since the width Δ of the partition wall in the radius direction is set to a value that avoids undesirable effects of the spread of a recording mark, deterioration of the phase pit signal after the recording operation is avoided.

According to the third feature, since the width Wp of the phase pit is set to a value enabling a sufficiently large amplitude of the phase pit signal, a reliable phase pit signal can be obtained and address information can be correctly reproduced.

According to the fourth feature, since the length Lp of the phase pit in the circular circumferential direction is set to a value enabling a sufficiently large amplitude of the phase pit signal, a reliable phase pit signal can be obtained and address information can be correctly reproduced.

According to the fifth feature, since the width Wp of the phase pit and the length Lp thereof in the circular circumferential direction are respectively set to values enabling sufficiently large amplitude of the phase pit signal, a reliable phase signal can be obtained and address information can be correctly reproduced.

According to the sixth feature, when the optical information recording medium referred to in anyone of the first through fifth features is mastered, the mastering parameters can be determined by the calculation. Therefore, the width Δ of the partition wall in the radius direction can be adjusted to a desirable value.

According tot he seventh feature, in the method of mastering the optical information recording medium, the adjustment of the width Δ of the partition walling the radius direction can be easily done with high precision.

Other numerous embodiments or numerous modifications of the disclosed embodiments are possible in light of the above teachings. It is therefore to be understood that within the scope of the appended claims, example of the invention may be practiced other than as specifically described herein.

It will be apparent to one of ordinary skill in the art that many changes and modifications can be made thereto without departing from the spirit and scope of the inventions claimed herein.

This application is based on Japanese Patent Application No. JPAP10-269, 723, filed on Sep. 24, 1998, and Japanese Patent Application No. JPAP10-289, 547, filed on Oct. 12, 1998, the entire contents of which are herein incorporated by reference.

What is claimed is:

1. An optical information recording medium comprising information tracks extending in a circumferential direction and spaced from each other in a radial direction by lands, wherein:
   a first information track and a second information track are radially adjacent but are radially spaced from each other by a single land;
   a first phase pit encoding preformat information for a first groove in the first information track is connected to the second information track and extends radially therefrom toward, but does not reach, the first information track;
   said first phase pit and said first groove have substantially equal depths;
   said first phase pit is radially connected with another groove adjoining on a side of the pit away from the first groove;

a partition wall is formed in a radial direction between said first phase pit and said first groove; and a track pitch of said first information track and a width and a length of said first phase pit are selected according to a condition that the preformat information for the first information track is reproduced from the first phase pit with a differential signal, wherein said first phase pit encodes preformat information for said first groove, is connected to said another groove, does not encode preformat information for said another groove and is not connected to said first groove.

2. The optical information recording medium as defined in claim 1,
wherein a width Δ of said partition wall in the radial direction and the track pitch TP satisfy the relationship:

$\Delta/TP < 0.1.$

3. The optical information recording medium as defined in claim 1,
wherein a width Wp of said phase pit, the length Lp of said phase pit in the circumferential direction, the track pitch TP, and a spot diameter BD of a recording/reproducing light beam satisfy the relationship:

$Lp/BD < 1.0$, and $0.8 \leq WP/TP \leq 0.9.$

4. The optical information recording medium as defined in claim 1,
wherein a width Wp of said phase pit, the length Lp of said phase pit in the circumferential direction, the track pitch TP, and a spot diameter BD of a recording/reproducing light beam satisfy the relationship:

$1.0 \leq Lp/BD$, and $0.5 \leq WP/TP \leq 0.8.$

5. The optical information recording medium as defined in claim 1, wherein a width Wp of said phase pit, the length Lp of said phase pit in the circumferential direction, the track pitch TP, and a spot diameter BD of a recording/reproducing light beam satisfy the relationship:

$1.0 \leq Lp/BD$, and $0.8 \leq WP/TP \leq 0.9.$

6. An optical information recording medium comprising:
circumferentially extending grooves forming information tracks and phase pits forming circumferentially extending preformat tracks; and a partition wall formed in a radial direction between a phase pit for a first groove and the first groove, wherein said first groove and phase pit are substantially equally deep, said phase pit is radially connected with another groove adjoining on a side of the phase pit away from the first groove, said phase pit encodes preformat information for said first groove, is connected to said another groove, does not encode preformat information for said another groove and is not connected to said first groove, and a track pitch of said given information track and a width and a length of said phase pits are selected according to a condition that the preformat information for the given information track is reproduced from said phase pits with a differential signal.

7. The optical information recording medium as defined in claim 6,
wherein a width Δ of said partition wall in the radial direction and the track pitch TP of said information track satisfy the relationship:

$\Delta/TP \geq 0.1.$

8. The optical information recording medium as defined in claim 6,
wherein a width Wp of said phase pits, the length Lp of said phase pits in the circumferential direction, the track pitch TP of said information tracks, and a spot diameter BD of a recording/reproducing light beam satisfy the relationship:

$Lp/BD < 1.0$, and $0.8 \leq WP/TP \leq 0.9.$

9. The optical information recording medium as defined in claim 6,
wherein a width Wp of said phase pits, the length Lp of said phase pits in the circumferential direction, the track pitch TP of said information tracks, and a spot diameter BD of a recording/reproducing light beam satisfy the relationship:

$1.0 \leq Lp/BD$, and $0.5 \leq WP/TP \leq 0.8.$

10. The optical information recording medium as defined in claim 6,
wherein a width Wp of said phase pits, the length Lp of said phase pits in the circumferential direction of said information tracks, the track pitch TP of said information tracks, and a spot diameter BD of a recording/reproducing light beam satisfy the relationship:

$1.0 \leq Lp/BD$, and $0.8 \leq WP/TP \leq 0.9.$

11. A method of mastering an optical information recording medium comprising information tracks extending in a circumferential direction and spaced from each other in a radial direction by lands, comprising:

exposing a master to a first exposing light beam for forming a first information track and a second information track that are radially adjacent but are radially spaced from each other by a single land;

exposing said master to a second exposing light beam for forming a first phase pit encoding preformat information for a first groove in the first information track, wherein said first phase pit is connected to the second information track and extending radially therefrom toward, but not reaching, the first information track, said phase pit is radially connected with another groove adjoining on a side of the phase pit away from the first groove, a partition wall is formed in a radial direction between said first phase pit and said first groove, and said first phase pit and said first groove have substantially equal depths;

wherein said first phase pit encodes preformat information for said first groove, is connected to said another groove, does not encode preformat information for said another groove and is not connected to said first groove;

wherein, when a spot diameter of said first exposing light beam is BD1, a spot diameter of said second exposing light beam is BD2, a distance between said first and second exposing light beams is L, and the width of said partition wall in the radial direction is $\Delta$, the values of BD1, BD2, L, and $\Delta$ satisfy the relationship:

$$\Delta = L - [(BD1/2) + (BD2/2)]; \text{ and}$$

wherein a track pitch of said first information track and a width and a length of said first phase pit are selected according to a condition that the preformat information for the first information track is reproduced from the first phase pit with a differential signal.

12. The method of mastering as defined in claim 11, wherein the values of said spot diameters BD1 and BD2 of said first and second exposing light beams are respectively fixed to constant values; and wherein the distance L between the spots of said first and second exposing light beams is adjusted by changing the incident angle of at least one of said exposing light beams directed to an object lens by use of a light deflection element.

* * * * *